United States Patent [19]
Wagner

[11] 3,870,139
[45] Mar. 11, 1975

[54] SHINGLING APPARATUS FOR FOOD ITEMS

[76] Inventor: Richard C. Wagner, c/o Integral Process Systems, Inc., 70 North St., Park Forest, Ill. 60466

[22] Filed: July 27, 1973

[21] Appl. No.: 383,340

[52] U.S. Cl............................ 198/34, 53/62, 198/40, 198/110, 214/7
[51] Int. Cl............................................ B65g 47/26
[58] Field of Search............ 198/76, 35, 29, 34, 110, 198/37, 40; 214/7; 93/93 C; 53/62

[56] References Cited
UNITED STATES PATENTS

| | | | |
|---|---|---|---|
| 2,604,972 | 7/1952 | Schmied | 198/35 |
| 2,966,253 | 12/1960 | Gerrans | 198/37 |
| 3,145,828 | 8/1964 | Hawley | 198/35 |
| 3,155,221 | 11/1964 | Griner | 198/76 |
| 3,207,288 | 9/1965 | Talbot et al. | 198/35 |
| 3,282,399 | 11/1966 | Morton | 198/35 |
| 3,363,739 | 1/1968 | Mebus | 198/40 X |
| 3,374,875 | 3/1968 | Griner | 198/35 |
| 3,395,784 | 8/1968 | Kanarek | 198/76 |
| 3,661,242 | 5/1972 | Clancy | 198/34 |

FOREIGN PATENTS OR APPLICATIONS
1,120,768 7/1968 Great Britain...................... 198/76

Primary Examiner—Evon C. Blunk
Assistant Examiner—Richard K. Thomson
Attorney, Agent, or Firm—Hofgren, Wegner, Allen, Stellman & McCord

[57] ABSTRACT

Apparatus for shingling stackable items and particularly food items such as frozen food patties in spaced successive groups of a predetermined plurality of items in each group arranged in edge overlap for easy processing such as pick-up in vertical stacks. The apparatus supplies the items in at least one row and transfers the items to a shingling conveyor that receives the items in overlapped groups. The disclosure also includes first speed control means for periodically operating the shingling conveyor at a speed less than the transfer conveyor to assemble the items in groups in which successive items in each group have overlapped edges and second speed control means for periodically operating the shingling conveyor at a speed greater than the transfer conveyor at the conclusion of the assembling of each group to separate groups.

7 Claims, 6 Drawing Figures

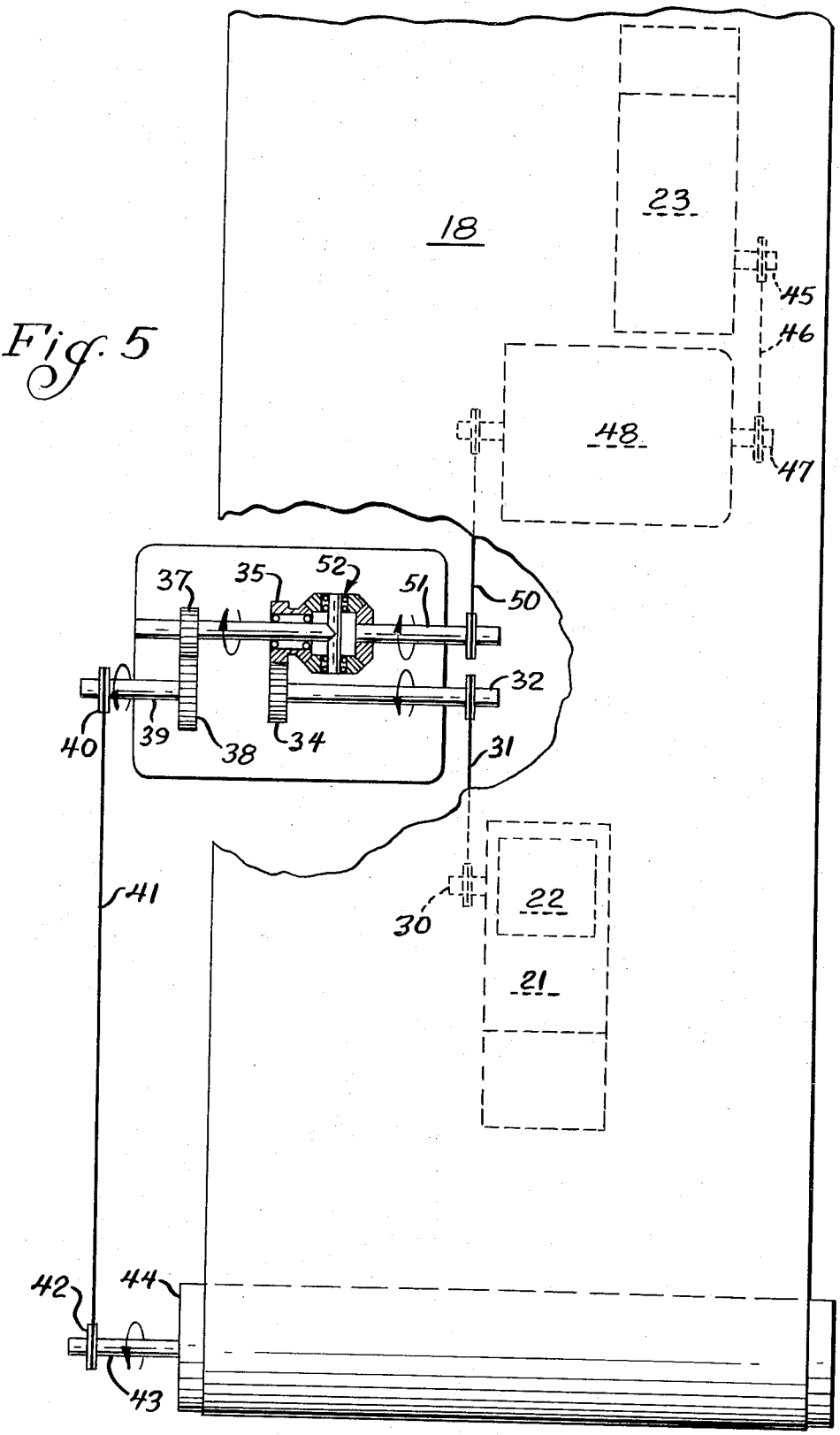

SHINGLING APPARATUS FOR FOOD ITEMS

BACKGROUND OF THE INVENTION

The apparatus of this invention is particularly adapted for arranging stackable food items such as frozen food items in spaced groups of a plurality of items in each group and overlapping them so that they are arranged in spaced assembly for further processing. One of the features of this invention therefore is to provide such an apparatus.

BRIEF DESCRIPTION OF THE DRAWINGS

FIG. 5 is a plan view illustrating the arrangement of certain operating parts of the apparatus.

DESCRIPTION OF THE PREFERRED EMBODIMENT

Figure 1:
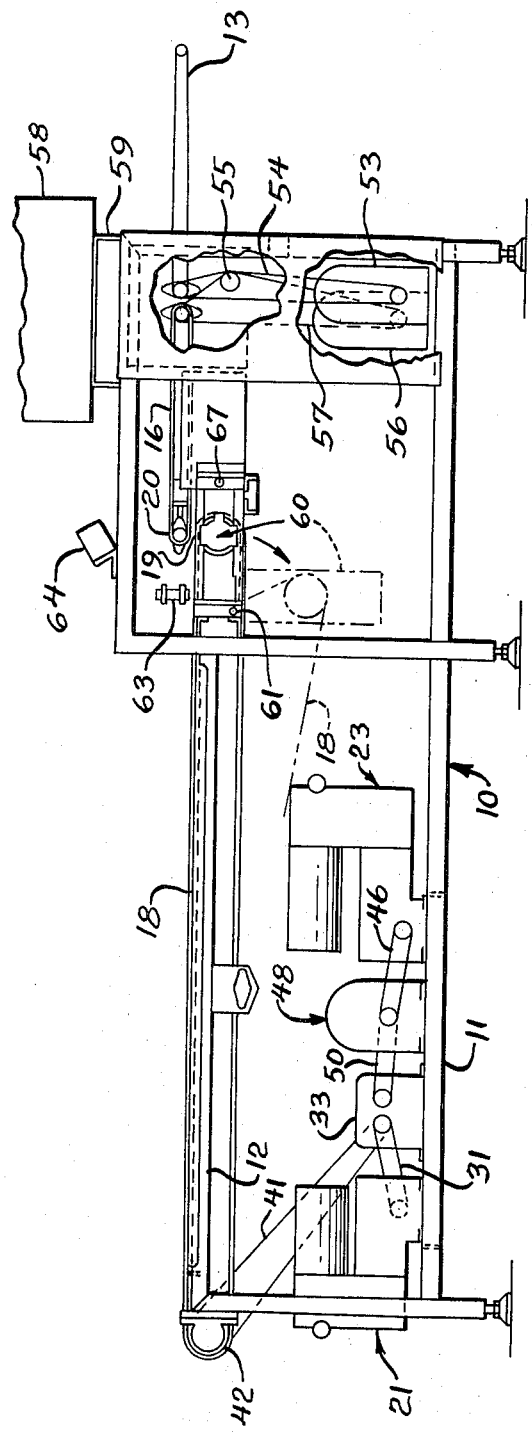
FIG. 1 is a side elevational view of an apparatus embodying the invention.
Figure 2:
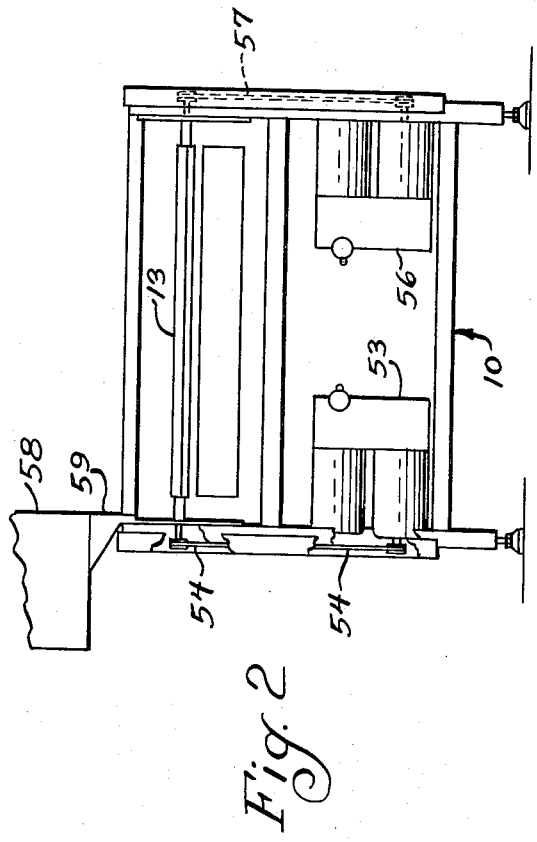
FIG. 2 is an end elevation thereof partially broken away and taken from the right-hand end of FIG. 1.

In the illustrated embodiment the apparatus comprises a frame 10 having a lower portion 11 on which is supported certain power portions of the operating structure.

Supported on the top 12 of the frame is feed means 13 in the form of a short conveyor for supplying the items 14 which in this embodiment are frozen ground beef patties that are fed to the conveyor 13 by a freezer belt 15 from a freezer tunnel (not shown).

Figure 4:
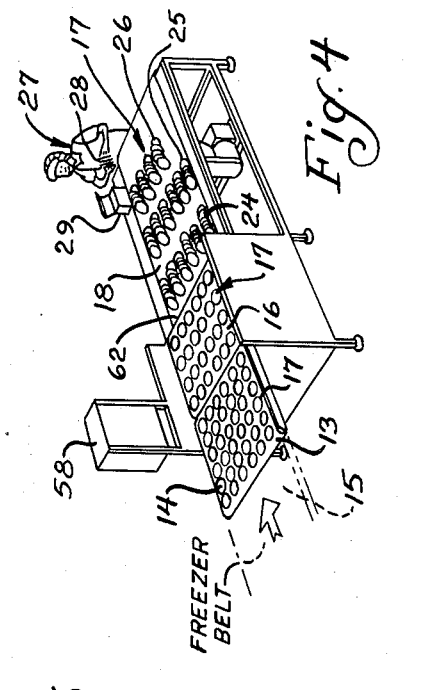
FIG. 4 is a simplified perspective view illustrating the operation of the apparatus of this invention.

As can be seen in FIG. 4 the patties 14 are very closely spaced together on the conveyor 13. Receiving the patties 14 from the conveyor 13 is a transfer conveyor 16 which operates at a greater speed than the first conveyor 13 so as to separate the items 14 in each longitudinal row 17 a distance greater than their separation on the first conveyor 13.

Also mounted on the top or upper portion 12 of the frame is a shingling conveyor 18 which as shown in FIG. 1 has its entrance end 19 arranged directly below the exit end 20 of the transfer conveyor 16.

Mounted on the lower portion 11 of the frame 10 are various speed control and driving means for operating the shingling conveyor 18 at the preselected speeds for preselected times. The driving apparatus comprises a first speed control means 21 in the form of a motor drive which in this embodiment has a ½ horsepower motor 22 and has a speed control so as to provide an output of from 12.1–121 rpm as selected by the operator. Such a unitary motor and control in this embodiment is identified as a Reeves Motordrive of a size 05W16.

Also mounted on the lower portion 11 of the frame 10 is a second speed control means 23 that is the same type as the motor drive 21 but which is of ¾ horsepower, size 1W16 and operable over a range of 36.8–368 rpm.

The first speed control means 21 is adapted for periodically operating the shingling conveyor 18 at a speed less than that of the transfer conveyor 16 to assemble the items or patties 14 in groups 24 in which successive items in each group have overlapped edges or are shingled as is illustrated by the groups in FIG. 4.

The second speed control means 23 is adapted for periodically operating the shingling conveyor 18 at a speed greater than that of the transfer conveyor 16 at the conclusion of the assembling of each group 24 so that successive groups 24, 25 and 26 in each elongated row 17 are spaced from each other as illustrated at the right end of FIG. 4.

With this automatic and preselected assembling of a predetermined number of items in each group the number of patties are automatically counted, shingled and spaced for each pick-up. Because of the shingling arrangement each packer illustrated by the FIG. 27 in FIG. 4 scoops up a shingled group. The patties almost automatically form a vertical stack 28 for fast packing as in the illustrated box 29.

The first speed control means 21 which is a combined speed control and motor drive is provided with a power shaft 30 which drives a chain 31 which itself rotates a shaft 32 of a differential transmission 33. This differential transmission may be any of a number of commercial devices and the one in the embodiment illustrated as a "Specon" differential transmission Model TD02.

The transmission 33 on the inner end of the shaft 32 as illustrated in FIG. 5 is provided with a rotary gear 34 that meshes with a smaller gear 35 that is mounted on a shaft 36 which carries a gear 37 that meshes with a larger gear 38 which is attached to an drives a power take-off shaft 39. This shaft 39 which extends from the end of the transmission 33 opposite the shaft 32 is provided with a sprocket 40 that drivingly engages an endless chain 41 that also passes over a sprocket 42 mounted on the end of a drive shaft 43. The shaft 43 carries a roller 44 around which passes the shingling conveyor 18 for driving the conveyor on rotation of the shaft 43 and roller 44.

The second speed control means 23 which also is embodied in a combined speed control and motor drive is likewise provided with a power shaft 45 that drives a chain 46 which operatively engages and drives a shaft 47 of a clutch-brake drive 48. This like the other items of the power equipment is a commercially available item and in the illustrated embodiment is a "Posidyne" Model 02B drive.

The output shaft 49 of this drive 48 operates a chain 50 which rotates a second input shaft 51 on the differential transmission 33 which is adjacent to and parallel with the first input shaft 32.

Rotation of the shaft 51 operating through gearing 52 also rotates the shaft 36 in the same direction as does the first speed control and motor drive 21. Thus it also drives the shingling conveyor 18 through the power take-off shaft 39, chain 41 and roller 44.

Also mounted in the lower portion 11 of the frame 10 are the drives for the first conveyor 13 and the transfer conveyor 16. Thus as shown in FIG. 1 there is provided an electric motor 53 that drives the first conveyor 13 by a chain 54 running over a take-up sprocket 55. Also mounted on the lower portion 11 of the frame 10 is a motor 56 that drives the transfer conveyor 16 through a chain 57. The electrical controls for the various motors and drives of the apparatus are conventional and are contained within a control cabinet 58 mounted on the frame 10 at one side thereof by means of a mounting bracket 59.

The clutch-brake drive 48 is operated by compressed air which is supplied thereto at about 80 psi and as noted is a commercially available and widely used item.

The shingling conveyor 18 is constructed of an easily cleaned neoprene and uses totally enclosed and waterproof motors.

The rear roller support structure 60 for the conveyor 18 may be swung down to the position shown in broken lines in FIG. 1 for relaxing the conveyor 18 to aid in servicing and cleaning. In order to accomplish this the roller support 60 is pivoted as indicated at 61.

The transfer conveyor 16 which as stated operates at a speed greater than that of the feed or first conveyor 13 projects the individual items 14 from the end 62 of the conveyor 16 to fall onto the surface of the shingling conveyor 18. In order to drop the items such as the frozen patties in the preselected group arrangement there is provided a transverse patty stop bar and mounting 63 above the end 19 of the conveyor 18. As the individual patties are projected by the relatively high speed conveyor 16 against the stop bar 63 they fall into the overlapped shingled arrangement as illustrated by the groups 24–26 in FIG. 4.

Figure 3:
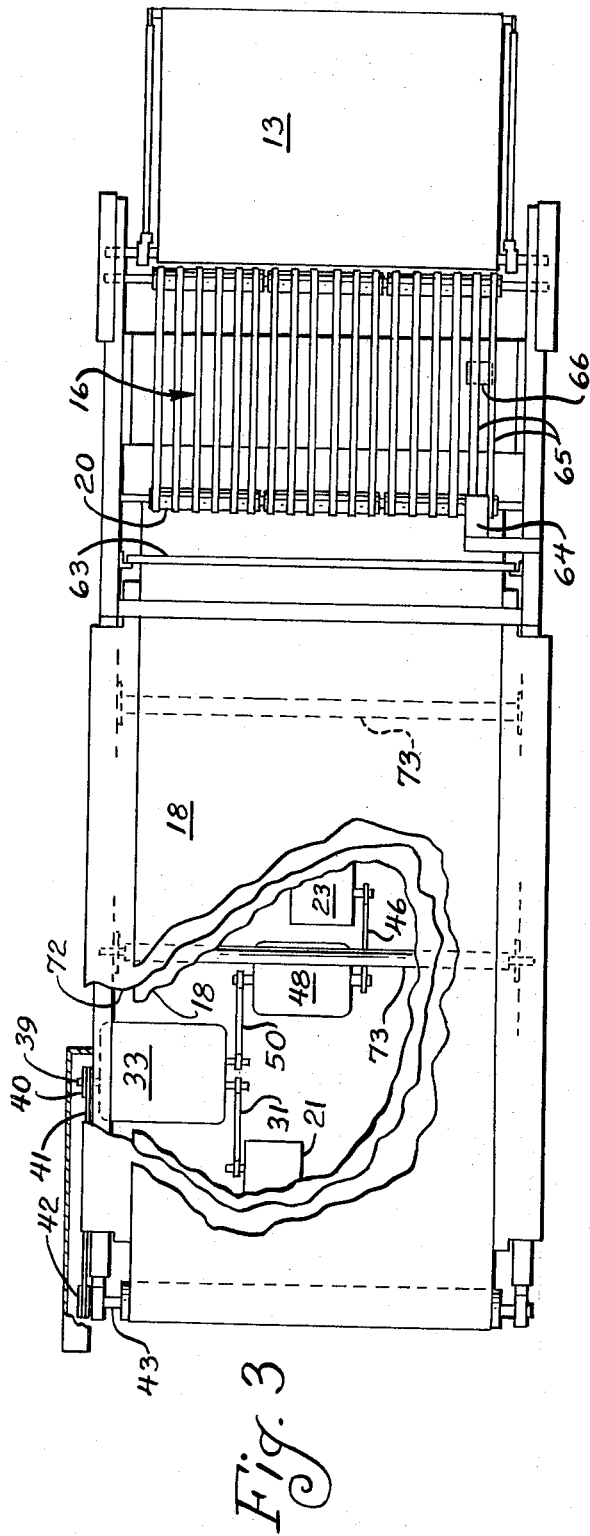
FIG. 3 is a plan view of the apparatus partially broken away.

In order to provide a control over the number of items in each group there is provided a photoelectric scanner device 64 which projects a light beam between the spaced flexible fabric strips 65 that comprise the transfer conveyor 16. This light beam is reflected back to the scanner 64 by a reflector mirror 66 that is mounted on a side support 67. The scanner 64 and reflector 66 are located at one side of the conveyor 16 as illustrated in FIG. 3 so that when only a single row of items is being collated the scanner and associated structure will provide the proper control. Where there is a plurality of rows such as extending all the way across the apparatus it will of course provide the same control for all the rows of items by providing the control on the first row.

The operation of the device is as follows. In the embodiment where the illustrated items are frozen food patties such as those of ground beef the patties 14 exit the freezer on a freezer belt 15 at the usual rapid rate and are transferred from the freezer belt 15 onto the first or feed conveyor 13 in the usual closely spaced arrangement.

From the feed conveyor 13 the patties are automatically transferred to the accelerating or transfer conveyor 16 which as shown in FIG. 1 is arranged closely adjacent the conveyor 13 so that the patties 14 on this higher speed conveyor 16 are spaced further apart. The high speed of the conveyor 16 projects the patties against the stop 63 so that they drop onto the slower moving shingling conveyor 18 in shingled groups 24, 25 and 26 each containing a preselected number of patties. The photoelectric scanner 64 counts the number of patties in a group, here the edge group 24 or 25, and periodically speeds up the conveyor 18 after the preselected number of patties has been shingled in each group. This provides the spacing between longitudinally successive rows of groups as illustrated in FIG. 4 so that the packer 27 can quickly scoop them up for packaging. In certain embodiments of course the groups are taken from the exit end of the shingling conveyor 18 by other arrangements such as automatic devices for further treatment such as cooking, canning and the like which are not shown here.

Thus in the apparatus of this invention the patties on the transfer conveyor 16 which is an accelerating conveyor are counted before they reach the shingling conveyor 18. The accelerating conveyor 16 drops the patties as previously explained onto the shingling conveyor 18 and the number of patties in each shingled group is of course adjustable. The air operated clutch-brake drive 48 periodically speeds up the shingling conveyor 18 after the preselected number of patties in each shingled group has been deposited with the result that the arranging of the patties in groups has two advantages. The first is that it provides a predetermined count of patties in each group of stack 28 and, second, it provides spacing between the successive groups for providing access to the groups.

As stated earlier, the first speed control and motor drive 21 operates at relatively low speed such as about 20 feet per minute for about 9.5 seconds. This provides the shingled overlap of the items or patties in each group. The second speed control and motor drive 23 operating through the compressed air clutch-brake drive 48 moves the shingling conveyor 18 at high speed for a short time such as 80 feet per minute for 0.5 seconds thereby providing the spacing between longitudinally adjacent groups. The drive 48 contains the customary on-off clutch for making the driving connection and a brake for halting the drive of the chain 50.

Figure 6:
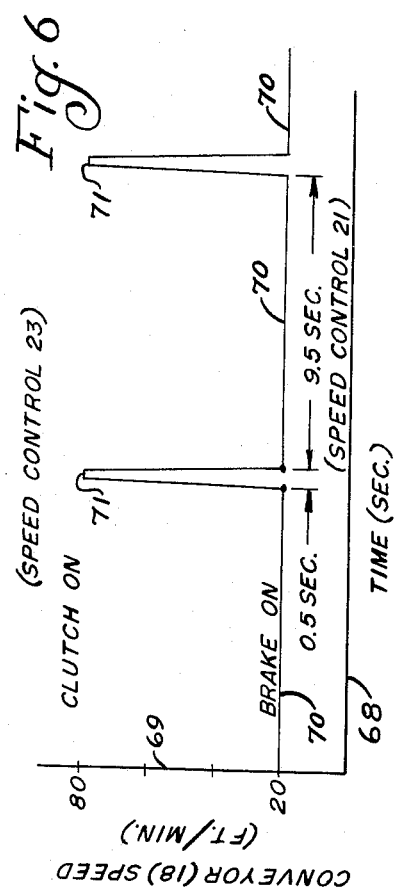
FIG. 6 is a time-shingling conveyor graph illustrating the speed of operation of one embodiment of the shingling conveyor over a typical time interval.

The operation of the apparatus is illustrated by the graph of FIG. 6. There the abscissa 68 is in time units and specifically seconds with the ordinate 69 in the conveyor 18 speed such as feet per minute. Thus as illustrated the first motor drive 21 operating when the brake of the drive 48 is in engagement moves the conveyor 18 at 20 feet per minute for a typical time of 9.5 seconds. This is illustrated by the spacing 70. Then, at the end of this 9.5 seconds there is a period of 0.5 seconds when the brake is off and the clutch is on where the conveyor 18 is operated as indicated at 71 at 80 feet per minute to provide the above-described spacing between adjacent groups.

During operation the conveyor 18 is supported on a plate 72 (FIG. 1). On the belt return it is supported by spaced rollers 73.

Having described my invention as related to the embodiment shown in the accompanying drrawings, it is my intention that the invention be not limited by any of the details of description, unless otherwise specified, but rather be construed broadly within its spirit and scope as set out in the appended claims.

I claim:

1. Apparatus for shingling stackable food items in spaced successive groups of a predetermined plurality of items in each group, comprising: feed means for supplying said items in at least one row; a light permeable transfer conveyor arranged to receive said items from said feed means and space the items apart a distance greater than the corresponding spacing of said items on said feed means; a shingling conveyor adjacent to said transfer conveyor receiving said items therefrom; first speed control means for periodically operating said shingling conveyor at a speed less than said transfer conveyor as an aid in assembling said items in groups in which successive items in each group have overlapped edges; second speed control means for periodically operating said shingling conveyor at a speed greater than said transfer conveyor at the conclusion of the assembling of each group to separate from each other successive said groups; and a photoelectric switch means for projecting a light beam through said conveyor, said light beam being interrupted by said items for operating said second speed control means at said conclusion of a preselected number of interruptions equivalent to a said group.

2. The apparatus of claim 1 wherein said transfer conveyor has an exit end arranged above the entrance end of said shingling conveyor; and there are provided means for operating said transfer conveyor at a speed to project said items therefrom and stop means spaced above said shingling conveyor for intercepting the projected items to permit them to drop on said shingling conveyor.

3. The apparatus of claim 1 wherein both said first and second speed control means are operatively connected to a differential transmission means selectively driven by each of said speed control means and drivingly connected to said shingling conveyor, said first speed control means being operatively connected directly to said differential transmission and said second speed control means being operatively connected to said differential transmission through a clutch and brake means for selectively operating said differential transmission and thus said shingling conveyor.

4. Apparatus for shingling stackable food items in spaced successive groups of a predetermined plurality of items in each group, comprising: feed means for supplying said items in at least one row; a transfer conveyor arranged to receive said items from said feed means and space the items apart a distance greater than the corresponding spacing of said items on said feed means; a shingling conveyor adjacent to said transfer conveyor receiving said items therefrom, said transfer conveyor having an exit end and the shingling conveyor having an entrance end, said exit end of said transfer conveyor being arranged above said entrance end of said shingling conveyor; means for operating said transfer conveyor at a speed to project said items therefrom; stop means spaced above said shingling conveyor for intercepting the projected items to permit them to drop on said shingling conveyor; first speed control means for periodically operating said shingling conveyor at a speed less than said transfer conveyor as an aid in assembling said items in groups in which successive items in each group have overlapped edges; and second speed control means for periodically operating said shingling conveyor at a speed greater than said transfer conveyor at the conclusion of the assembling of each group to separate from each other successive said groups.

5. The apparatus of claim 4 wherein both said first and second speed control means are operatively connected to a differential transmission means selectively driven by each of said speed control means and drivingly connected to said shingling conveyor, said first speed control means being operatively connected directly to said differential transmission and said second speed control means being operatively connected to said differential transmission through a clutch and brake means for selectively operating said differential transmission and thus said shingling conveyor.

6. Apparatus for shingling stackable food items in spaced succesive groups of a predetermined plurality of items in each group, comprising: feed means for supplying said items in at least one row; a transfer conveyor arranged to receive said items from said feed means and space the items apart a distance greater than the corresponding spacing of said items on said feed means; a shingling conveyor adjacent to said transfer conveyor receiving said items therefrom; first speed control means for periodically operating said shingling conveyor at a speed less than said transfer conveyor as an aid in assembling said items in groups in which successive items in each group have overlapped edges; and second speed control means for periodically operating said shingling conveyor at a speed greater than said transfer conveyor at the conclusion of the assembling of each group to separate from each other successive said groups, both said first and second speed control means being operatively connected to a differential transmission means selectively driven by each of said speed control means and drivingly connected to said shingling conveyor, said first speed control means being operatively connected to said differential transmission and said second speed control means being operatively connected to said differential transmission through a clutch and brake means for selectively operating said differential transmission and thus said shingling conveyor.

7. Apparatus for shingling stackable food items in spaced successive groups of a predetermined plurality of items in each group, comprising: feed means for supplying said items in at least one row; a light permeable transfer conveyor arranged to receive said items from said feed means and space the items apart a distance greater than the corresponding spacing of said items on said feed means; a shingling conveyor adjacent to said transfer conveyor receiving said items therefrom, said transfer conveyor having an exit end and the shingling conveyor having an entrance end, said exit end of said transfer conveyor being arranged above said entrance end of said shingling conveyor; means for operating said transfer conveyor at a speed to project said items therefrom; stop means spaced above said shingling conveyor for intercepting the projected items to permit them to drop on said shingling conveyor; first speed control means for periodically operating said shingling conveyor at a speed less than said transfer conveyor as an aid in assembling said items in groups in which successive items in each group have overlapped edges; second speed control means for periodically operating said shingling conveyor at a speed greater than said transfer conveyor at the conclusion of the assembling of each group to separate from each other successive said groups; and a photoelectric switch means for projecting a light beam through said conveyor, said light beam being interrupted by said items for operating said second speed control means at said conclusion of a preselected number of interruptions equivalent to a said group, both said first and second speed control means being operatively connected to a differential transmission means selectively driven by each of said speed control means and drivingly connected to said shingling conveyor, said first speed control means being operatively connected directly to said differential transmission and said second speed control means being operatively connected to said differential transmission through a clutch and brake means for selectively operating said differential transmission and thus said shingling conveyor.

\* \* \* \* \*